United States Patent [19]

Bauer et al.

[11] Patent Number: 4,478,186
[45] Date of Patent: Oct. 23, 1984

[54] CONTROL SYSTEM FOR AN INTERNAL COMBUSTION ENGINE WITH EXTERNALLY SUPPLIED IGNITION

[75] Inventors: Hartmut Bauer, Gerlingen; Bernhard Bonse, Korntal; Peter Schmidt, Schwieberdingen, all of Fed. Rep. of Germany

[73] Assignee: Robert Bosch GmbH, Stuttgart, Fed. Rep. of Germany

[21] Appl. No.: 377,489

[22] Filed: May 12, 1982

[30] Foreign Application Priority Data

May 23, 1981 [DE] Fed. Rep. of Germany ....... 3120667

[51] Int. Cl.³ ............................................. F02D 33/00
[52] U.S. Cl. .................................... 123/436; 123/478; 123/585
[58] Field of Search ............... 123/339, 436, 478, 585, 123/589, 571, 480, 486, 487, 489

[56] References Cited

U.S. PATENT DOCUMENTS 3,610,219 10/1971 Sciabica ......................... 123/478 X
3,875,907 4/1975 Wessel et al. .................. 123/489 X
4,140,083 2/1979 Frobenius ............................ 123/436

FOREIGN PATENT DOCUMENTS 2034930 6/1980 United Kingdom ................ 123/585

Primary Examiner—Tony M. Argenbright
Attorney, Agent, or Firm—Edwin E. Greigg

[57] ABSTRACT

A control system for internal combustion engines with externally supplied ignition and having a throttle valve in the air intake tube, a controllable bypass around the throttle valve and a fuel metering system, in which at least at predetermined operating states, a special fuel metering signal is formed in accordance with the control signal for the bypass opening and preferably also in accordance with the rpm. It is thereby possible to establish a supplementary air quantity and a supplementary fuel quantity independently of one another in individual operating ranges; this provides a great deal of freedom and makes it possible to attain quite various possible kinds of regulation, such as idling-rpm regulation, lambda regulation, engine smoothness regulation and fuel consumption regulations. For generating the special fuel metering signal, a performance graph is efficaciously used, by way of which various operating parameters, such as temperature, can be taken into account.

14 Claims, 6 Drawing Figures

CONTROL SYSTEM FOR AN INTERNAL COMBUSTION ENGINE WITH EXTERNALLY SUPPLIED IGNITION

RELATED APPLICATIONS

The following patents or applications of the same assignee are related to the subject matter of this application.

Application Ser. No. 323,795 filed Nov. 23, 1981, which is a Continuation-In-Part of Ser. No. 063,632 filed Aug. 2, 1979, now abandoned;

Application Ser. No. 434,297 filed Oct. 14, 1982, which is a Continuation of Ser. No. 187,128 filed Sept. 15, 1980, now abandoned;

Application Ser. No. 191,742 filed Sept. 29, 1980 now U.S. Pat. No. 4,417,556;

Application Ser. No. 212,769 filed Dec. 4, 1980, now U.S. Pat. No. 4,346,625, which is a Continuation of Ser. No. 114,765 filed Jan. 23, 1980, now abandoned; and U.S. Pat. No. 3,759,232.

BACKGROUND OF THE INVENTION

The invention relates to a control system for an internal combustion engine with externally supplied ignition, having an intake tube, a throttle valve mounted in the intake tube, a controllable bypass around the throttle valve and a fuel metering system.

A controllable throttle valve bypass serves as a rule to provide a capability of establishing a predetermined rpm during idling or in other words when the throttle valve is closed. If in such known systems the air quantity is measured in order to determined the required fuel quantity, then the air flow rate meter is disposed ahead of the bypass branching point upstream of the throttle valve, so that the air component in the bypass is detected as well. In this manner, so-called charge-level regulators are attained, which have constant fuel/air ratios.

A disadvantage of these known systems is that they can only be applied to a limited extent in systems which measure the air flow rate; thus it is not possible, for instance, to use fuel metering systems which determine the fuel quantity solely in accordance with the rpm and the position of the throttle valve. Furthermore, in the known systems the fuel-air mixture cannot be influenced or in other words optimized during idling, because a fuel quantity value is determined for every total air quantity. Also, the bypass of the known type cannot be used together with an optimal engine regulating means in terms of fuel consumption. This is because for the sake of optimizing fuel consumption, the air quantity oscillates while the fuel quantity remains constant.

OBJECT AND SUMMARY OF THE INVENTION

It is an object of this invention to provide an improved control system for externally ignited internal combustion engines having an intake tube, a throttle valve mounted in the intake tube, a controllable bypass around the throttle valve and a fuel metering system.

This object is achieved by the improvement including an adjusting device for adjusting the opening of the bypass, a control signal generator which generates a control signal applied to the adjusting device for adjusting the bypass opening, and a fuel quantity signal generator which also receives the control signal and generates, at least at predetermined operating states, such as idling, a fuel quantity signal.

The control system in accordance with the invention has the advantage that the greatest possible degree of freedom in influencing the fuel-air mixture is attainable. The air quantity and the fuel quantity can be adjusted separately, which leads to improved optimizing of regulation. It is particularly advantageous that this bypass can be used in the partial-load range for generating a test signal for optimal regulation in terms of fuel consumption, because in the control system according to the invention the influence exerted by the fuel quantity can be suppressed.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
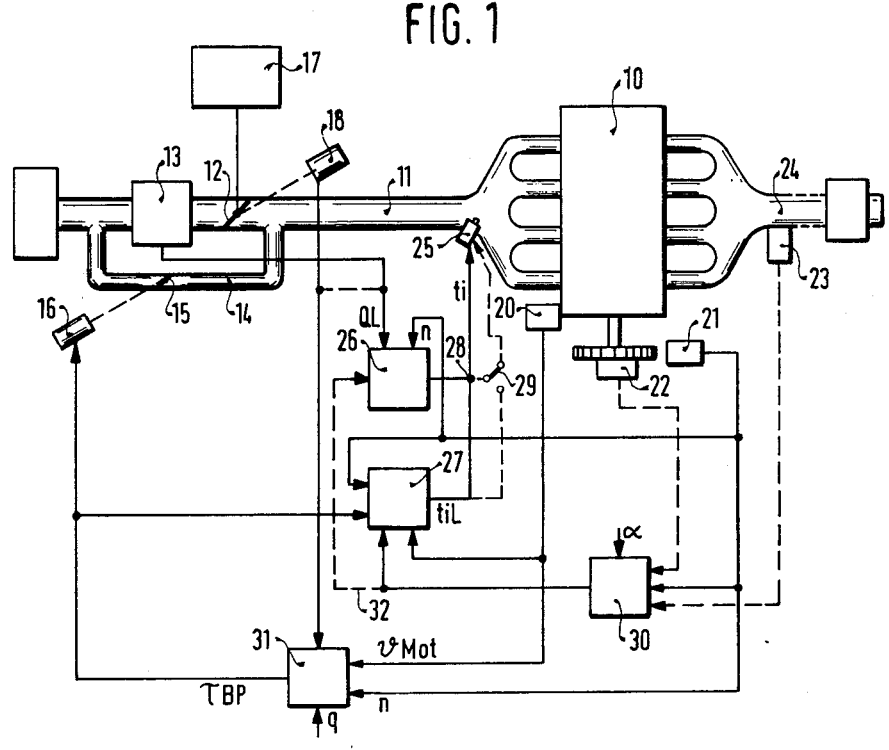
FIG. 1 is a block diagram showing the control system according to the invention.

The exemplary embodiment of FIG. 1 relates to an idling rpm regulation in an internal combustion engine with externally supplied ignition and fuel injection. The engine itself is indicated by reference numeral 10 and reference numeral 11 indicates its air intake tube with a throttle valve 12, an air flow rate meter 13, a bypass conduit 14 bypassing the throttle valve and the air flow rate meter and a cross section control element 15 in said bypass conduit 14. Reference numeral 16 indicates the adjusting device for the cross section control element 15 in the bypass conduit 14. A driving pedal is marked 17. It acts directly upon the position of the throttle valve 12, and this position is detected by means of the throttle valve angle transducer 18.

Attached to the engine itself are a temperature sensor 20, a sensor 21 for the rpm or the duration of a revolution, and a torque sensor 22. Finally, there is an exhaust gas sensor 23 in the exhaust tube 24.

The fuel metering is effected via at least one injection valve 25, which receives a basic control pulse ti from a first timing element 26, which in turn receives input signals from the air flow rate meter 13 or from the throttle valve angle transducer 18, as well as from the rpm sensor 21. A special metering signal til is formed in a second timing element 27. The output signals of the two timing elements 26 and 27 reach the injection valve 25 either via a summing point 28 or via an alternating switch 29 indicated beside the summing point by broken lines.

The input signals for the second timing element 27 are signals from the temperature sensor 20, from a regulator 30 (for instance, a lambda regulator, engine-smoothness regulator or fuel consumption regulator) and from a regulating unit 31 for the idling rpm. The signal from the regulating unit 31 for the idling rpm corresponds to the trigger signal τBP for the adjusting device 16 of the cross section control element 15. The input variables for this regulating unit 31 are an output of the throttle valve angle transducer 18, the temperature sensor 20 and the rpm transducer 21. An input q for a battery-voltage correction is also provided. Finally, the regulator 30 receives its input signals from the rpm sensor 21, the torque sensor 22 and the exhaust gas sensor 23.

The important feature of the subject of FIG. 1 is that in contrast to known systems, the bypass conduit 14 bypasses the throttle valve 12 and the air flow rate meter 13. For this reason, the air quantity flowing through the bypass does not affect the quantity of fuel to be metered, or at least does not do so directly.

In accordance with the invention, a supplementary fuel quantity is determined in the embodiment according to FIG. 1 depending upon the opening cross section of the bypass. Any arbitrary dependency can be established thereby. In the exemplary embodiment, a fuel injection system has been selected as the fuel metering system. Thus in this instance it is the injection time which must be influenced. The following formula defines the dependency of the injection time during idling, tiL, on the cross section of the bypass opening or on the trigger signal τBP of the adjusting device 16, as well as on the rpm n:

$$tiL = a \cdot (\tau BP - b) 1/n + c$$

In this formula, a, b and c are selectable constants.

In addition to determining tiL via this formula or some other (for instance, tiL = a·τBP + b), with τBP and n as independent variables, the injection time can also be determined from a performance graph, for instance, either directly or via an interpolation process.

The constants a, b and c of the above formula or in the performance graph are determined empirically.

Figure 2:
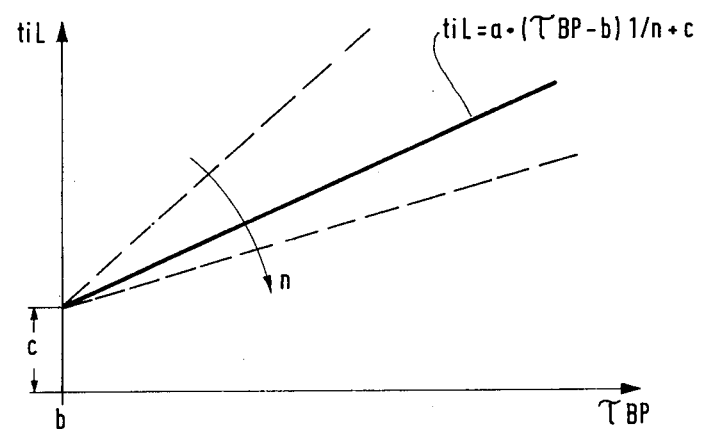
FIG. 2 shows a characteristic curve explaining the control system of FIG. 1.

FIG. 2 shows a performance graph such as that resulting from the above formula.

Figure 3:
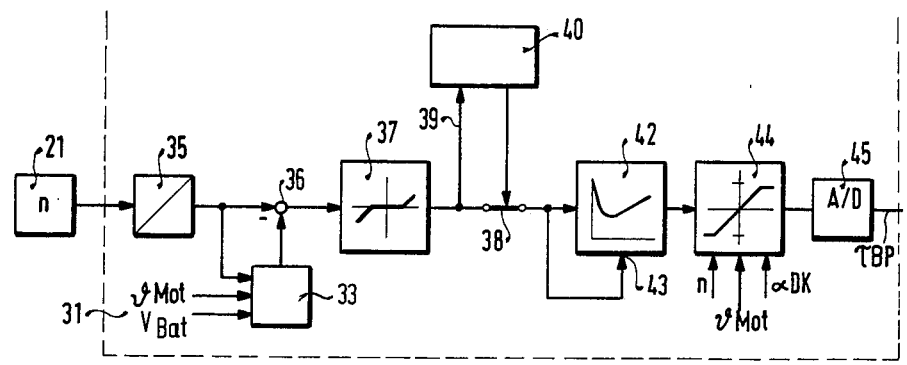
FIG. 3 is a block circuit diagram showing a detail of the subject of FIG. 1.

FIG. 3, in the form of a detailed block circuit diagram, shows a detail of the subject of FIG. 1, namely the regulating unit 31 for the idling rpm. The rpm input signals from the rpm sensor 21 is applied to a pulse forming circuit 35. An rpm set-point/actual-value comparison 36 follows; in the selected example in a set-point generator 33, the set-point rpm is selected to be dependent on the actual rpm, the engine temperature θMot and the battery voltage $V_{BAT}$. Block 37 defines a so-called dead zone. It creates a certain insensitivity zone in the response behavior of the rpm regulating unit 31. Following block 37 is a switch 38 for switching the rpm regulation over to fuel consumption regulation. The switching position of this switch 38 is determined by the output signal of block 37. If the value of this signal is too high, then the fuel consumption regulator 40 is switched off via the line 39; that is, the test signal of the fuel consumption regulator 40 is stopped, and the switch 38 assumes the indicated switching position for rpm regulation. As a result, it is assured that the apparatus will move into rpm regulating operation when there is an excessively large deviation rpm from the set-point value, while otherwise it can function as a fuel consumption regulator. Thus, the fuel consumption regulation does not have to be active at all times; it will suffice for it to function only briefly at certain intervals, for instance every several seconds.

The switch 38 is followed by a PID regulator 42 with a control input 43 for adapting the individual parameters to individual operating characteristics, such as the regulated deviation of the rpm. A limitation circuit 44 for the output signal of the regulator 42 follows, and the upper and/or lower limitation is efficaciously capable of being influenced by operating characteristics such as actual rpm n, engine temperature θMot and throttle valve position αDK. Finally, the preparation of the output signal of the limitation circuit 44 into a signal modulated pulse length is effected in a subsequent analog/digital converter 45, for the purpose of direct triggering of the adjusting device 16 and of the second timing element 27.

Figure 4:
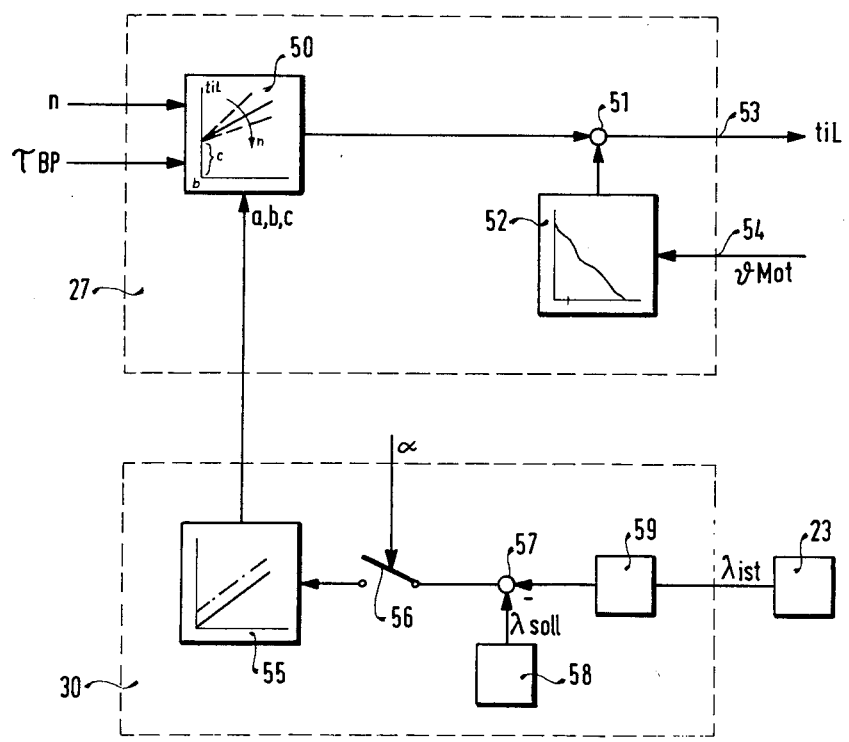
FIGS. 4-6 are block circuit diagrams showing various possibilities for intervening in the system, relating respectively to a means of lambda regulation, engine smoothness regulation and regulation for optimal fuel consumption.
Figure 5:
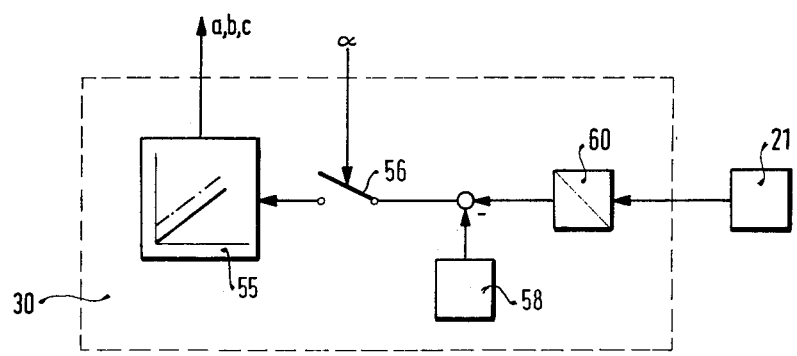
Figure 6:
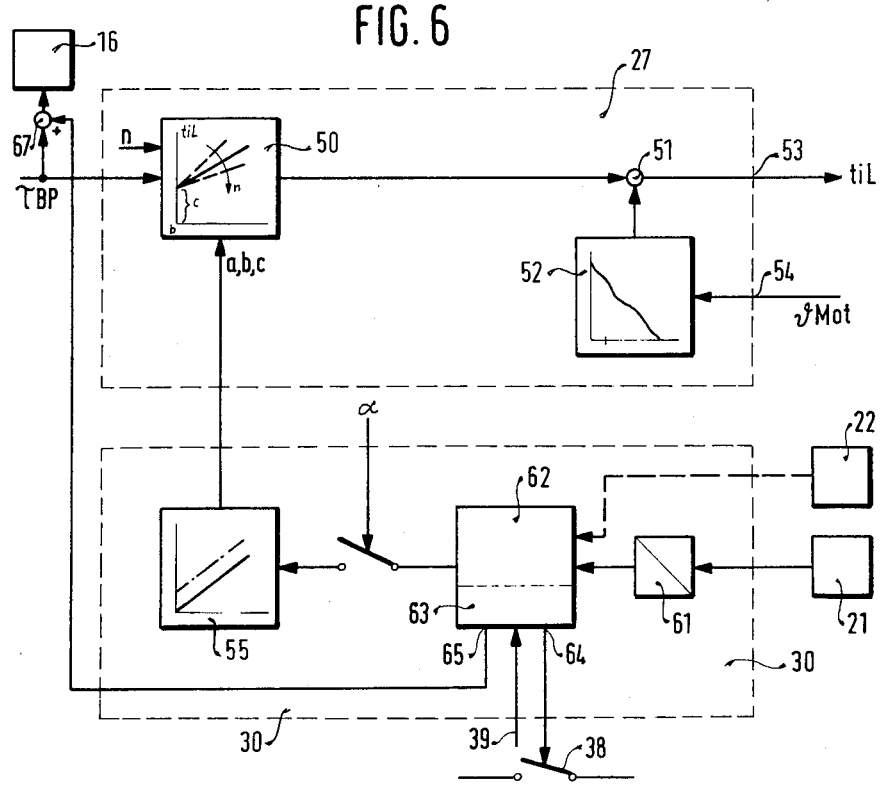

Details of the second timing element 27 for influencing the quantity of fuel to be measured in accordance with the opening cross section of the bypass 14 are shown in FIGS. 4, 5 and 6.

According to FIG. 4, block 27, as the second timing element of the embodiment of FIG. 1, includes a performance graph 50 and a multiplier circuit 51, which is supplied with the output signals of the performance graph 50 and a characteristic curve generator 52. On the output side, the multiplier circuit 51 is directly connected with an output 53 for emitting the signal tiL. While the output signal of the characteristic curve generator 52 is dependent on a temperature signal θMot via an input 54, the individual input variables of the performance graph 50 are determined by the input signals τBP and n and by the values a, b and c, which are formed as separate variables in the regulator 30.

The primary component of block 30, in turn, is a regulator 55 of the integral type, whose input signal is determined by the exhaust gas composition applied to the regulator 55 by a switch 56 which is closed only in the event of idling. To this end, there is a lambda/set-point/actual-value comparison via a comparison circuit 57, with a set point λsoll derived from a corresponding set-point specification circuit 58 and the respective measured lambda/actual value λist being received from sensor 23 and prepared in a control circuit 59.

The apparatus of FIG. 4 is distinguished by the fact that the conversion of the trigger signal τBP for the adjusting device 16 into a fuel metering signal tiL, which is performed in the second timing element 27 of FIG. 1, can be influenced as follows:
either additively, by varying the parameters b or c, multiplicatively, by varying parameter a, or additively and multiplicatively.

In addition, there is a superimposed regulation with integral behavior for these individual values, and there is an opportunity to regulate the mixture to lambda = 1 with the aid of a lambda signal from the sensor 23.

FIG. 5 shows fundamentally the same apparatus as FIG. 4, with the distinction that the regulator 30 has the function not of lambda regulation but of regulation to a predetermined engine smoothness value. To this end, a signal from the rpm transducer 21 reaches an engine smoothness measurement unit 60, in which variations in the frequency of the output signal of the transducer 21 are converted into engine smoothness values, and these values can then be processed further so as to provide regulation of the engine smoothness.

FIG. 6 shows details of the regulator 30 in connection with fuel consumption regulation ($be_{min}$). The signal from the rpm transducer 21 reaches a $be_{min}$ regulator 62 having a test-signal generator 63 via a pulse shaping circuit 61. If the system includes a torque transducer 22, then its output signal is delivered instead of the rpm signal to the be$_{min}$ regulator 62, which enables rapid regulation. The test-signal generator 63 has an input for interrupting the test signal if there is too great an rpm deviation. (In this regard, see the line 39 in connection with FIG. 3.) The switch 38 of FIG. 3 is switched off via an output line 64, so that the output signal of the regulating unit 33 (FIG. 3) does not undergo any change.

On the other side, however, a digital test signal proceeds via an output 65 of the test-signal generator 63 to an adding circuit 67 in the triggering line for the adjusting device 16. In this adding circuit 67, because of the opened switch 38, the output signal of the regulator 31 is then changed with the test signal, and the bypass air is oscillated thereby. Because of this signal linkage, a cyclical variation in the bypass cross section is made and thus there is a cyclical leaning down of the mixture, without the second timing element 27 of FIG. 1 for supplementary fuel metering coming into effect.

The effects of the various kinds of superimposed regulation attainable via the apparatuses of FIGS. 4-6 should be adapted to one another in accordance with the particular engine type in question. Different integration time constants, in the integral regulator 25, for instance, or a supplementary proportional component are possible ways to achieve this.

The superimposed kinds of regulation can be used not only to influence the idling injection time tiL but also, in a manner which is known in principle, to optimize the injection time outside the idling range; this is indicated by signal 32 in FIG. 1.

It has been found that the above-described control system, because of its control of fuel quantity in accordance with the bypass cross section, is capable of furnishing a very precise fuel quantity, with great driving comfort; furthermore, because of the many ways in which influence can be exerted, the most various parameters can be taken into consideration.

The foregoing relates to preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. In a control system for externally ignited, internal combustion engines, having an intake tube, a throttle valve mounted in the intake tube, a controllable bypass around the throttle valve, and a fuel metering system, the improvement comprising:
an adjusting device for adjusting the opening cross section of the bypass;
control signal generating means connected to the adjusting device for generating a control signal applied to the adjusting device for adjusting the bypass opening; means for generating a load signal dependent on air flow via said throttle valve and applying said signal to said control generating means, and
fuel quantity signal generating means forming part of the fuel metering system connected to receive the control signal from the control signal generating means, said fuel quantity signal generating means producing a fuel metering signal dependent on load and rpm which signal is influenced by said control signal from said control signal generator.

2. In the control system as defined in claim 1 wherein the fuel quality signal is generated during idling.

3. In the control system as defined in claim 1, wherein the fuel quantity signal generating means, for generating the fuel quantity signal, is connected to also receive an rpm signal, a temperature signal, an exhaust gas composition signal, and an engine smoothness signal.

4. In the control system as defined in claim 1, wherein the fuel quantity signal generating means, for generating the fuel quantity signal, is connected to also receive an rpm signal, a temperature signal, and exhaust gas composition signal and a specific fuel consumption signal.

5. In the control system as defined in claim 1, wherein the fuel quantity signal is additive to the fuel quantity signal generated by the fuel metering system.

6. In the control system as defined in claim 1, wherein the fuel quantity signal is applied alternatively to the fuel quantity signal generated by the fuel metering system.

7. In the control system as defined in claim 2, wherein the fuel quantity signal is generated by the fuel quantity signal generator, during idling, in accordance with the following formula:

$$tiL = a \cdot (\tau BP - b) 1/n + c$$

8. In the control system as defined in claim 2, wherein the fuel quantity signal generator includes memory means for generating the fuel quantity signal.

9. In the control system as defined in claim 1, wherein lambda regulation is achieved by controlling the bypass opening and generating the fuel quantity signal.

10. In the control system as defined in claim 1, wherein engine smoothness regulating is achieved by controlling the bypass opening and generating the fuel quantity signal.

11. In the control system as defined in claim 1, wherein fuel consumption regulation is achieved by controlling the bypass opening cross section and generating the fuel quantity signal.

12. In the control system as defined in claim 1, wherein the fuel quantity signal is held constant during idling to achieve fuel consumption regulation ($^{be}$min).

13. In the control system as defined in claim 1, wherein the fuel quantity signal is held constant during partial load to achieve fuel consumption regulation ($^{be}$min).

14. In the control system as defined in claim 1, wherein the fuel quantity signal is held constant during idling and partial load to achieve fuel consumption regulation ($^{be}$min).

* * * * *